United States Patent
Mashima et al.

[11] Patent Number: 5,919,288
[45] Date of Patent: Jul. 6, 1999

[54] METHOD FOR SUPPRESSING FOAMS IN BOOTH CIRCULATING WATER

[75] Inventors: Hiroshi Mashima, Inba-gun; Takao Kageyama, Hiratsuka; Kazuo Uenoyama, Osaka, all of Japan

[73] Assignee: Nippon Paint Co., Ltd., Osaka, Japan

[21] Appl. No.: 08/945,338

[22] PCT Filed: Feb. 27, 1997

[86] PCT No.: PCT/JP97/00579

§ 371 Date: Dec. 11, 1997

§ 102(e) Date: Dec. 11, 1997

[87] PCT Pub. No.: WO97/31694

PCT Pub. Date: Sep. 4, 1997

[30]      Foreign Application Priority Data

Feb. 27, 1996  [JP]  Japan ................................... 8-067137

[51] Int. Cl.⁶ ................................................. B01D 19/04
[52] U.S. Cl. ............................... 95/155; 95/196; 134/38; 210/765; 210/930; 427/331
[58] Field of Search ............................ 95/155, 195, 196; 134/38; 210/712, 749, 750, 930, 765; 427/331

[56]               References Cited

U.S. PATENT DOCUMENTS

| | | | |
|---|---|---|---|
| 4,125,476 | 11/1978 | Dean | 252/115 |
| 4,378,235 | 3/1983 | Cosper et al. | 210/708 |
| 5,282,970 | 2/1994 | Wepf | 210/641 |
| 5,292,547 | 3/1994 | Schlumpf et al. | 427/8 |
| 5,330,659 | 7/1994 | Schapira et al. | 210/725 |
| 5,419,487 | 5/1995 | Nielson et al. | 239/10 |

FOREIGN PATENT DOCUMENTS

| | | |
|---|---|---|
| 0 075 094 A1 | 3/1983 | European Pat. Off. . |
| 2 063 096 | 6/1981 | United Kingdom . |

*Primary Examiner*—Peter A. Hruskoci
*Attorney, Agent, or Firm*—Pollock, Vande Sande & Amernick

[57] ABSTRACT

In a water recycle painting system wherein a water paint is spray painted on an object to be painted in a painting booth, and wherein over sprayed paint captured in booth circulating water is condensed and recovered to be mixed with the water paint for reuse, a method for suppressing foams in booth circulating water for effectively suppressing foams in booth circulating water generated when spray painting water paint to thereby maintain a good working environment, the method being characterized in that the booth circulating water includes a silicone antifoamer (A) and a hydrophilic high-boiler (B).

10 Claims, 1 Drawing Sheet

METHOD FOR SUPPRESSING FOAMS IN BOOTH CIRCULATING WATER

This application is a 371 of PCT/JP97/00579 filed Feb. 27, 1997.

TECHNICAL FIELD

The present invention relates to a method of inhibiting bubbling of booth circulating water in a water-borne recycle coating system.

BACKGROUND ART

For spray-coating with a water-based paint, it is common practice to use a spray booth in order to prevent contamination of the working environment. The booth water is circulated in this spray booth so that the water-based paint which is not deposited on the substrate upon spraying may be trapped by the booth water (referred to as booth circulating water) as an over-spray paint and, therefore, not scattered. However, when the water-based paint finds its way into the booth circulating water, copious surface bubbles are formed and sometimes overflow to contaminate the spray booth and ancillary equipment.

Moreover, while the water-based paint trapped by the booth circulating water is generally recycled, the copious production of bubbles in the booth circulating water and overflows from the spray booth interfere with recovery of the water-based paint, thus causing the problem of a waste of materials. Therefore, in view of better workability and prevention of pollutions, inhibition of bubbling of the booth circulating water has been demanded by the industry.

Japanese Koukai Publication Hei-7-100415 discloses a water-based paint mist elimination device which recovers the bubbles formed on the surface of booth circulating water in one location, taking them out from the spray booth, and destroying the pooled bubbles. Since, in this technology, the bubbles formed in booth circulating water are removed from the spray booth to prevent overflowing, there must be provided a bubble recovery tank and a heater or other device for breaking up the bubbles, so that the equipment is of necessity large-scale.

SUMMARY OF THE INVENTION

Accomplished in view of the above state of the art, the present invention has for its object to provide a method for inhibiting bubbling of booth circulating water by which the bubbles formed in booth circulating water upon spray-coating a water-based paint can be effectively controlled to maintain the working environment in good condition.

The present invention is essentially directed to a method for inhibiting bubbling of booth circulating water in a water-borne recycle coating system wherein a substrate is spray-coated with a Fater-based paint in a spray booth and any over-spray paint trapped in the booth circulating water is concentrated and recovering for reuse in admixture with said water-based paint, which comprises that the booth circulating water contains a silicone antifoamer (A) and a hydrophilic high-boiling solvent (B).

Figure 1:
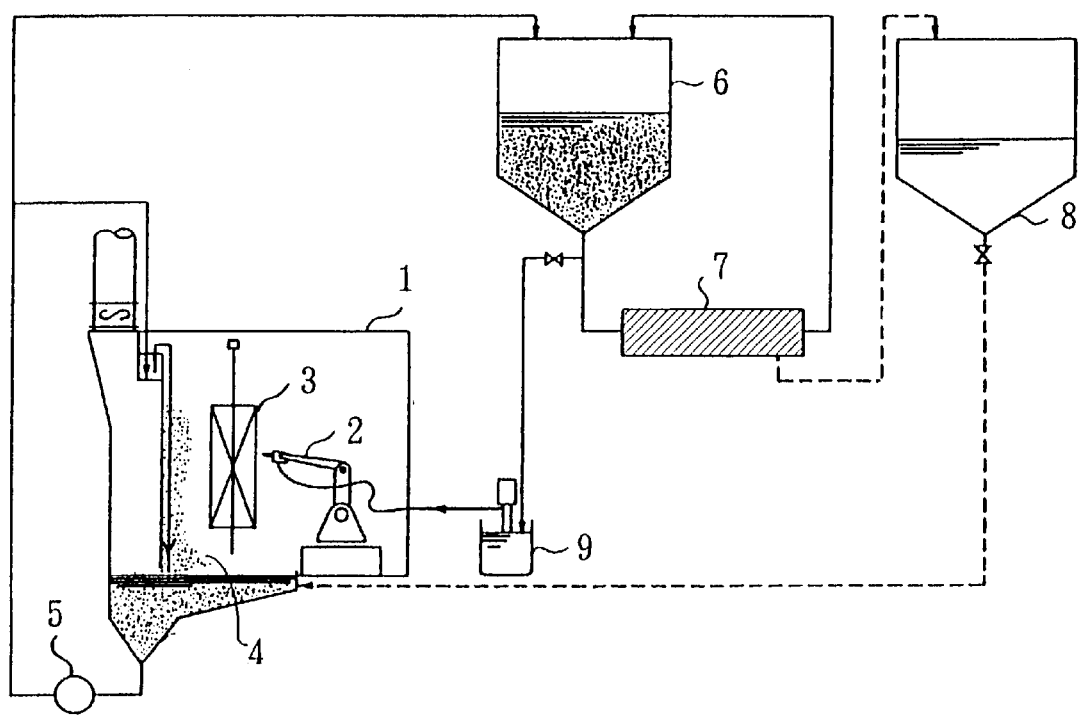
FIG. 1 shows a typical water-borne recycle coating system to which the method for inhibiting bubbling of booth circulating water according to the invention can be applied.

Legends:
1. Spray booth
2. Spray gun
3. Substrate
4. Over-spray paint
5. Pump
6. Concentration tank
7. Filter
8. Filtrate tank
9. Paint tank

DETAILED DISCLOSURE OF THE INVENTION

The present invention is now described in detail.

In the water-borne recycle coating system to be used in the present invention, booth circulating water is circulated in a spray booth in order to trap an over-spray paint which is formed upon spray coating of a substrate with a water-based paint.

The substrate mentioned above is virtually unlimited in kind but includes a variety of substrates, e.g. vehicle components such as automotive bodies and engine blocks, metallic furniture such as lockers, etc., household electrical appliance housings, and architectural members, among others.

The water-based paint mentioned above is not limited in kind, either, but includes paints based on acrylic resin, polyester resin, alkyd resin, modified alkyd resin, e.g. epoxy-modified, rosin-modified, and phenol resin-modified alkyds, etc., and paints composed of a water-soluble or water-dispersible resin such as polyurethane resin in combination with a melamine resin, and epoxy resin or modified epoxy resin. Those paints may be whichever of the baking paint and the cold-setting paint.

The water-based paint for use is adequately selected according to the kind of substrate and intended application.

Where necessary, said water-based paint may contain a variety of additives such as a pigment, an extender, a rust preventive, a surface conditioner, a curing catalyst, an antifoamer, and/or a hydrophilic high-boiling solvent.

The booth circulating water for use in the present invention contains a silicone antifoamer (A) and a hydrophilic high-boiling solvent (B).

The silicone antifoamer (A) mentioned above is virtually not limited in kind but includes alkyl polysiloxanes such as dimethyl polysiloxane, and modified alkyl polysiloxanes available upon modification with a polyether. Particularly preferred is dimethyl polysiloxane.

As said silicone antifoamer (A), commercial products can be selectively employed. For example, BYK-034, BYK-036, BYK-045 (Byk Chemie), and Nopco 8034L (Sun-Nopco) can be mentioned.

The preferred molecular weight of said silicone antifoamer (A) is 50,000 to 180,000. If the molecular weight is less than 50,000, antifoaming activity is too low, while an antifoamer with a molecular weight of over 180,000 has a poor affinity for booth circulating water.

The preferred concentration of said silicone antifoamer (A) is 0.002 to 0.5 weight % based on the total booth circulating water. At any concentration below 0.002 weight %, no sufficient antifoaming effect can be expected. On the other hand, if the upper limit of 0.5 weight % is exceeded, the film derived from the recycled paint tends to develop defects such as cratering and cissing and the practice is economically disadvantageous, too. The more preferred concentration is 0.02 to 0.2 weight %.

The silicone antifoamer (A) may be directly added to booth circulating water or alternatively be incorporated in the water-based paint to be used so that it will be added to booth circulating water through the over-spray paint. When the silicone antifoamer (A) is incorporated in the water-based paint, its proportion is preferably in the range of 0.01 to 1.0 weight % based on the total water-based paint.

The hydrophilic high-boiling solvent (B) is not particularly limited in kind but includes butyl diglycol and butyl cellosolve, to mention just a few preferred examples. Particularly preferred is butyl cellosolve.

The preferred concentration of said hydrophilic high-boiling solvent (B) is 2 to 15 weight % based on the total booth circulating water. When it is less than 2 weight % or exceeds 15 weight %, no satisfactory antifoaming effect can be achieved. The more preferred concentration is 2 to 8 weight % for a baking water-based paint and 6 to 13 weight % for a cold-setting water-based paint.

In the present invention, the concentration of said hydrophilic high-boiling solvent (B) is controlled within the range of 2 to 15 weight %. The controlling process can be either by direct addition of said hydrophilic high-boiling solvent (B) to booth circulating water or by addition of a primary water-based paint containing said hydrophilic high-boiling solvent (B) to booth circulating water via the over-spray paint.

When the primary paint is in advance supplemented with the hydrophilic high-boiling solvent (B), the proportion of hydrophilic high-boiling solvent (B) is preferably 3 to 12 weight % based on the total primary paint. If the proportion of (B) is less than 3 weight %, there will not be realized a sufficient addition of (B) via the over-spray paint to the booth circulating water. If the upper limit of 12 weight % is exceeded, the concentration of (B) in booth circulating water will become too high.

BEST MODE FOR CARRYING OUT THE INVENTION

FIG. 1 is a typical water-borne recycle coating system employing the method for inhibiting bubbling of booth circulating water according to the present invention.

A spray booth 1 is equipped with a spray gun 2 for ejecting a water-based paint from a paint tank 9. For coating, the water-based paint is ejected from the spray gun 2 against a substrate 3 set in said spray booth 1. The resulting over-spray paint 4 is trapped by booth circulating water flowing in the spray booth 1. Since the booth circulating water contains said silicone antifoamer (A) and hydrophilic high-boiling solvent (B), bubbling of the water can be controlled so that the over-spray paint 4 may be effectively trapped, concentrated, and reused.

The booth circulating water pooled in the bottom of the spray booth 1 is aspirated by a pump 5 and a portion is transferred to the spray booth 1, while the remainder is transferred to a concentration tank 6 for recovery of the paint. The booth circulating water containing the over-spray paint 4 in the concentration tank 6 is filtered by a filter 7.

The filtered paint is returned to the concentration tank 6, while the filtrate is sent to a filtrate tank 8. This filtrate is properly fed from the filtrate tank 8 to the spray booth 1 for use as booth circulating water. On the other hand, the filtered paint is concentrated, regenerated, and sent to the paint tank 9 as the recovered paint.

The silicone antifoamer (A) and hydrophilic high-boiling solvent (B) contained in the booth circulating water may undergo change in concentration, for the silicone antifoamer and hydrophilic high-boiling solvent in the over-spray paint dissolve out into the booth circulating water or are evaporated in the course of circulation. Therefore, the booth circulating water is sampled periodically from a sampling cock (not shown) disposed in the water circuit and determined for the concentrations of silicone antifoamer (A) and hydrophilic high-boiling solvent (B) and the concentrations are adjusted as required.

In the water-borne recycle coating system employing the method for inhibiting bubbling of booth circulating water according to the present invention, the bubbling of the booth circulating water is inhibited so that the equipment is not contaminated and the water-based paint can be recycled without waste of the paint.

The following examples are intended to describe the present invention in further detail and should by no means be construed as defining the scope of the invention.

EXAMPLE 1

A paint solution was prepared according to the following recipe: 0.1 weight % of an aqueous antifoamer solution [16 weight parts of a silicone antifoamer (BYK-034, Byk Chemie), 5 weight parts of butyl cellosolve, and 79 weight parts of deionized water], 20 weight % of a primary paint (a baking water-based paint: Eau-de-select 500, Nippon Paint), 3.5 weight % of butyl cellosolve, and 76.4 weight % of deionized water.

The above paint solution, 40 g, was taken in a polyethylene cup (100 cc). using a baby pump, the solution was bubbled for 60 seconds and the time for antifoaming (disappearing bubbles) was measured. The results are shown in Table 1. The evaluation criteria used are as follows.

⊚: The bubbles subsided within 10 seconds
○: The bubbles subsided in 10 to 30 seconds
Δ: The bubbles subsided in 30 to 60 seconds
x : The bubbles persisted over 60 seconds

Comparative Example 1

Except that the aqueous antifoamer solution was not added, the procedure of Example 1 was otherwise repeated to provide a paint solution. Using this paint solution, antifoaming performance was evaluated as in Example 1. The result is shown in Table 1.

EXAMPLE 2

Except that butyl cellosolve was used in a proportion of 5.2 weight %, the procedure of Example 1 was otherwise repeated to provide a paint solution. using this paint solution, antifoaming performance was evaluated as in Example 1. The result is shown in Table 1.

Comparative Example 2

Except that the aqueous antifoamer solution was not added, the procedure of Example 2 was otherwise repeated to provide a paint solution. Using this paint solution, antifoaming performance was evaluated as in Example 1. The result is shown in Table 1.

EXAMPLE 3

Except that butyl cellosolve was used in a proportion of 6.9 weight %, the procedure of Example 1 was otherwise repeated to provide a paint solution. Using this paint solution, an tifoaming performance was evaluated as in Example 1. The result is shown in Table 1.

Comparative Example 3

Except that the aqueous antifoamer solution was not added, the procedure of Example 3 was otherwise repeated to provide a paint solution. Using this paint solution, antifoaming performance was evaluated as in Example 1. The result is shown in Table 1.

TABLE 1

|  | Solvent content (weight %) | Antifoaming performance |
|---|---|---|
| Example 1 | 3.5 | ⊚ |
| Example 2 | 5.2 | ⊚ |
| Example 3 | 6.9 | ⊚ |
| Comparative Example 1 | 3.5 | x |
| Comparative Example 2 | 5.2 | Δ |
| Comparative Example 3 | 6.9 | x |

EXAMPLE 4

A paint solution was prepared according to the following recipe: 0.1 weight % of an aqueous antifoamer solution [16 weight parts of a silicone antifoamer (BYK-034, Byk Chemie), 5 weight parts of butyl cellosolve, and 79 weight parts of deionized water], 20 weight % of the recovered paint (baking water-based paint: Eau-de-Select 500, Nippon Paint), 3.5 weight % of butyl cellosolve, and 76.4 weight % of deionized water.

Using this paint solution, antifoaming performance was evaluated as in Example 1. The result is shown in Table 2.

Comparative Example 4

Except that the aqueous antifoamer solution was not added, the procedure of Example 4 was otherwise repeated to provide a paint solution. Using this paint solution, antifoaming performance was evaluated as in Example 1. The result is shown in Table 2.

EXAMPLE 5

Except that butyl cellosolve was used in a proportion of 5.0 weight %, the procedure of Example 4 was otherwise repeated to provide a paint solution. Using this paint solution, antifoaming performance was evaluated as in Example 1. The result is shown in Table 2.

Comparative Example 5

Except that the aqueous antifoamer solution was not added, the procedure of Example 5 was otherwise repeated to provide a paint solution. Using this paint solution, antifoaming performance was evaluated as in Example 1. The result is shown in Table 2.

EXAMPLE 6

Except that butyl cellosolve was used in a proportion of 5.8 weight %, the procedure of Example 4 was otherwise repeated to provide a paint solution. Using this paint solution, antifoaming performance was evaluated as in Example 1. The result is shown in Table 2.

Comparative Example 6

Except that the aqueous antifoamer solution was not added, the procedure of Example 6 was otherwise repeated to provide a paint solution. Using this paint solution, antifoaming performance was evaluated as in Example 1. The result is shown in Table 2.

Comparative Example 7

Except that butyl cellosolve was used in a proportion of 9.0 weight %, the procedure of Example 4 was otherwise repeated to provide a paint solution. Using this paint solution, antifoaming performance was evaluated as in Example 1. The result is shown in Table 2.

Comparative Example 8

Except that butyl cellosolve was used in a proportion of 1.0 weight %, the procedure of Example 4 was otherwise repeated to provide a paint solution. Using this paint solution, antifoaming performance was evaluated as in Example 1. The result is shown in Table 2.

TABLE 2

|  | Solvent content (weight %) | Antifoaming performance |
|---|---|---|
| Example 4 | 3.5 | ⊚ |
| Example 5 | 5.0 | ⊚ |
| Example 6 | 5.8 | ○ |
| Comparative Example 4 | 3.5 | ○ |
| Comparative Example 5 | 5.0 | Δ |
| Comparative Example 6 | 5.8 | x |
| Comparative Example 7 | 9.0 | x |
| Comparative Example 8 | 1.0 | Δ |

EXAMPLE 7

A paint solution was prepared according to the following recipe: 0.2 weight % of an aqueous antifoamer solution [10 weight parts of a silicone antifoamer (Nopco 8034L, Sun Nopco), 10 weight parts of butyl diglycol, and 80 weight parts of deionized water], 20 weight % of a primary paint (cold-setting water-based paint: Eau-de-Recycle F-1000, Nippon Paint), 6.5 weight % of butyl diglycol, and 73.3 weight % of deionized water.

Using the above paint solution, antifoaming performance was evaluated as in Example 1. The result is shown in Table 3.

Comparative Example 9

Except that the aqueous antifoamer solution was not added, the procedure of Example 7 was otherwise repeated to provide a paint solution. Using this paint solution, antifoaming performance was evaluated as in Example 1. The result is shown in Table 3.

EXAMPLE 8

Except that butyl diglycol was used in a proportion of 9.8 weight %, the procedure of Example 7 was otherwise repeated to provide a paint solution. Using this paint solution, antifoaming performance was evaluated as in Example 1. The result is shown in Table 3.

Comparative Example 10

Except that the aqueous antifoamer solution was not added, the procedure of Example 8 was otherwise repeated to provide a paint solution. Using this paint solution, antifoaming performance was evaluated as in Example 1. The result is shown in Table 3.

EXAMPLE 9

Except that butyl diglycol was used in a proportion of 12.7 weight %, the procedure of Example 7 was otherwise repeated to provide a paint solution. Using this paint solution, antifoaming performance was evaluated as in Example 1. The result is shown in Table 3.

Comparative Example 11

Except that the aqueous antifoamer solution was not added, the procedure of Example 9 was otherwise repeated to provide a paint solution. Using this paint solution, antifoaming performance was evaluated as in Example 1. The result is shown in Table 3.

TABLE 3

|  | Solvent content (weight %) | Antifoaming performance |
| --- | --- | --- |
| Example 7 | 6.5 | ◉ |
| Example 8 | 9.8 | ◉ |
| Example 9 | 12.7 | ○ |
| Comparative Example 9 | 6.5 | Δ |
| Comparative Example 10 | 9.8 | x |
| Comparative Example 11 | 12.7 | x |

EXAMPLE 10

A paint solution was prepared according to the following recipe: 0.2 weight % of an aqueous antifoamer solution [10 weight parts of a silicone antifoamer (Nopco 8034L, Sun Nopco), 10 weight parts of butyl diglycol, and 80 weight parts of deionized water], 20 weight % of the recovered paint (cold-setting water-based paint: Eau-de-Recycle F-1000, Nippon Paint), 6.5 weight % of butyl diglycol, and 73.3 weight % of deionized water.

Using the above paint solution, antifoaming performance was evaluated as in Example 1. The result is shown in Table 4.

Comparative Example 12

Except that the aqueous antifoamer solution was not added, the procedure of Example 10 was otherwise repeated to provide a paint solution. Using this paint solution, antifoaming performance was evaluated as in Example 1. The result is shown in Table 4.

EXAMPLE 11

Except that butyl diglycol was used in a proportion of 9.8 weight %, the procedure of Example 10 was otherwise repeated to provide a paint solution. Using this paint solution, antifoaming performance was evaluated as in Example 1. The result is shown in Table 4.

Comparative Example 13

Except that the aqueous antifoamer solution was not added, the procedure of Example 11 was otherwise repeated to provide a paint solution. Using this paint solution, antifoaming performance was evaluated as in Example 1. The result is shown in Table 4.

EXAMPLE 12

Except that butyl diglycol was used in a proportion of 12.7 weight %, the procedure of Example 10 was otherwise repeated to provide a paint solution. Using this paint solution, antifoaming performance was evaluated as in Example 1. The result is shown in Table 4.

Comparative Example 14

Except that the aqueous antifoamer solution was not added, the procedure of Example 12 was otherwise repeated to provide a paint solution. Using this paint solution, antifoaming performance was evaluated as in Example 1. The result is shown in Table 4.

TABLE 4

|  | Solvent content (weight %) | Antifoaming performance |
| --- | --- | --- |
| Example 10 | 6.5 | ◉ |
| Example 11 | 9.8 | ◉ |
| Example 12 | 12.7 | ○ |
| Comparative Example 12 | 6.5 | Δ |
| Comparative Example 13 | 9.8 | x |
| Comparative Example 14 | 12.7 | x |

INDUSTRIAL APPLICABILITY

By the method for inhibiting bubbling of booth circulating water according to the present invention, bubbling of the circulating water trapping of over-spray paint is effectively inhibited as described above so that the equipment is not contaminated to help maintain the working environment in good condition. Therefore, the method can be advantageously applied to a water-borne recycle coating system.

We claim:

1. A method for inhibiting bubbling of booth circulating water in a water-borne recycle coating system wherein a substrate is spray-coated with a water-based paint in a spray booth and any over-spray paint trapped in the booth circulating water is concentrated filtered from said circulating water, and recovered for reuse in admixture with said water-based paint, wherein the booth circulating water contains (A) 0.002 to 0.5 weight % based on the total booth circulating water, of a silicone antifoamer having a molecular weight of 50,000 to 180,000 and (B) 2 to 15 weight % based on the total booth circulating water, of a hydrophilic high-boiling solvent, to inhibit said bubbling.

2. The method for inhibiting bubbling of booth circulating water according to claim 1 wherein said hydrophilic high-boiling solvent (B) is added directly to the booth circulating water.

3. The method for inhibiting bubbling of booth circulating water according to claim 1 wherein said hydrophilic high-boiling solvent (B) is incorporated in the water-based paint so as to be added to the booth circulating water through an over-spray paint.

4. The method according to claim 3 wherein said hydrophilic high-boiling solvent (B) is incorporated in the water-based paint in an amount of 3 to 12 weight %.

5. The method according to claim 1 wherein sad water-based paint is a baking water-based paint, and said hydrophilic high-boiling solvent (B) is contained in an amount of 2 to 8 weight % based on the total booth circulating water.

6. The method according to claim 1 wherein said water-based paint is a cold-setting water-based paint, and said hydrophilic high-boiling solvent (B) is contained in an amount of 6 to 13 weight % based on the total booth circulating water.

7. The method of claim 1 wherein the silicone antifoamer is employed in a concentration of 0.02 to 0.2 weight % based upon the total booth circulating water.

8. The method of claim 1 wherein the silicone antifoamer is incorporated in the water-based paint in a concentration of 0.01 to 1.0 weight % based on the total water-based paint.

9. The method of claim 1 wherein the silicone antifoamer is dimethyl polysiloxane.

10. The method of claim 1 wherein the hydrophilic high-boiling solvent is butyl diglycol or butyl cellosolve.

* * * * *